(12) United States Patent
Miller et al.

(10) Patent No.: US 8,863,767 B2
(45) Date of Patent: Oct. 21, 2014

(54) ALIGNMENT SYSTEM FOR FLAPPER VALVE

(75) Inventors: Wade A. Miller, Broken Arrow, OK (US); Robert J. Dyer, Coweta, OK (US); Michael L. Hair, Tulsa, OK (US); Thomas S. Myerley, Broken Arrow, OK (US); Leonard D. Medill, Bixby, OK (US); Matthew P. Presley, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 266 days.

(21) Appl. No.: 13/423,711

(22) Filed: Mar. 19, 2012

(65) Prior Publication Data

US 2013/0240051 A1 Sep. 19, 2013

(51) Int. Cl.
*F16K 15/03* (2006.01)
*F16K 37/00* (2006.01)

(52) U.S. Cl.
USPC ............... 137/15.17; 137/315.16; 137/527.8; 137/559

(58) Field of Classification Search
USPC ........... 137/315.16, 527.8, 559, 15.17–15.19; 251/298, 366
See application file for complete search history.

(56) References Cited

U.S. PATENT DOCUMENTS

| | | | |
|---|---|---|---|
| 3,468,472 A * | 9/1969 | Hahn | 137/223 |
| 3,749,358 A * | 7/1973 | Bates | 251/298 |
| 3,955,623 A | 5/1976 | Aumann | |
| 4,457,376 A | 7/1984 | Carmody et al. | |
| 4,813,481 A * | 3/1989 | Sproul et al. | 137/527.8 |
| 5,125,457 A | 6/1992 | Meaders | |
| 5,323,859 A | 6/1994 | Smith et al. | |
| 5,682,921 A | 11/1997 | Rawson et al. | |
| 6,666,271 B2 | 12/2003 | Deaton et al. | |
| 6,851,477 B2 | 2/2005 | Hill, Jr. et al. | |
| 7,493,770 B2 * | 2/2009 | Christianson et al. | 137/527 |
| 2004/0000407 A1 | 1/2004 | Hernandez et al. | |
| 2010/0264346 A1 | 10/2010 | Bussear | |
| 2011/0290344 A1 | 12/2011 | Groesbeck et al. | |

FOREIGN PATENT DOCUMENTS

WO 2008109189 A1 9/2008

OTHER PUBLICATIONS

International Search Report and Written Opinion; International Application No. PCT/US2013/024813; International Filing Date: Feb. 6, 2013; Date of Mailing: May 14, 2013; 9 pages.
Schlumberger, [online]; [retrieved on Apr. 20, 2012]; retrieved from the Internet http://www.slb.com/~/media/Files/sand_control/product_sheets/quantum_large_bore_flapper_valve.ashx, "QUANTUM Large-Bore Flapper Val," Jan. 2004, 2p.

* cited by examiner

*Primary Examiner* — Kevin Lee
(74) *Attorney, Agent, or Firm* — Cantor Colburn LLP

(57) ABSTRACT

A valve assembly, including a seat and a flapper complementarily formed with respect to the seat for creating a seal at an interface therebetween. At least one shim is operatively disposed in the valve assembly for altering a position of the flapper relative to the seat in at least one direction for aligning the flapper and the seat at the interface. A method of aligning the flapper and seat of a valve assembly is also included.

18 Claims, 4 Drawing Sheets

US 8,863,767 B2

ALIGNMENT SYSTEM FOR FLAPPER VALVE

BACKGROUND

Flapper valve assemblies are ubiquitous in the downhole drilling and completions industry, e.g., for use in subsurface safety valve systems among others. These valves include a flapper or lid that closes against a seat for forming a seal. Leaking may occur through these valves if the flapper and the seat are misaligned, particularly at low pressures when the flapper is not pressed firmly against the seat. One cause of this misalignment results from the summation or stack-up of the tolerances of the components of the valve assembly. That is, a complex arrangement like a flapper valve assembly has many components, and while the effect of the tolerances of any individual component is essentially negligible, the sum of all tolerances can result in undesired variances for the assembly as a whole. Accordingly, the industry would well receive systems for improving the performance of flapper valve assemblies.

BRIEF DESCRIPTION

A valve assembly, including a seat; a flapper complementarily formed with respect to the seat for creating a seal at an interface therebetween; and at least one shim operatively disposed in the valve assembly for altering a position of the flapper relative to the seat in at least one direction for aligning the flapper and the seat at the interface.

A method of aligning a flapper and a seat of a valve assembly, including positioning at least one shim in the valve assembly for altering a position of the flapper relative to the seat in at least one direction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
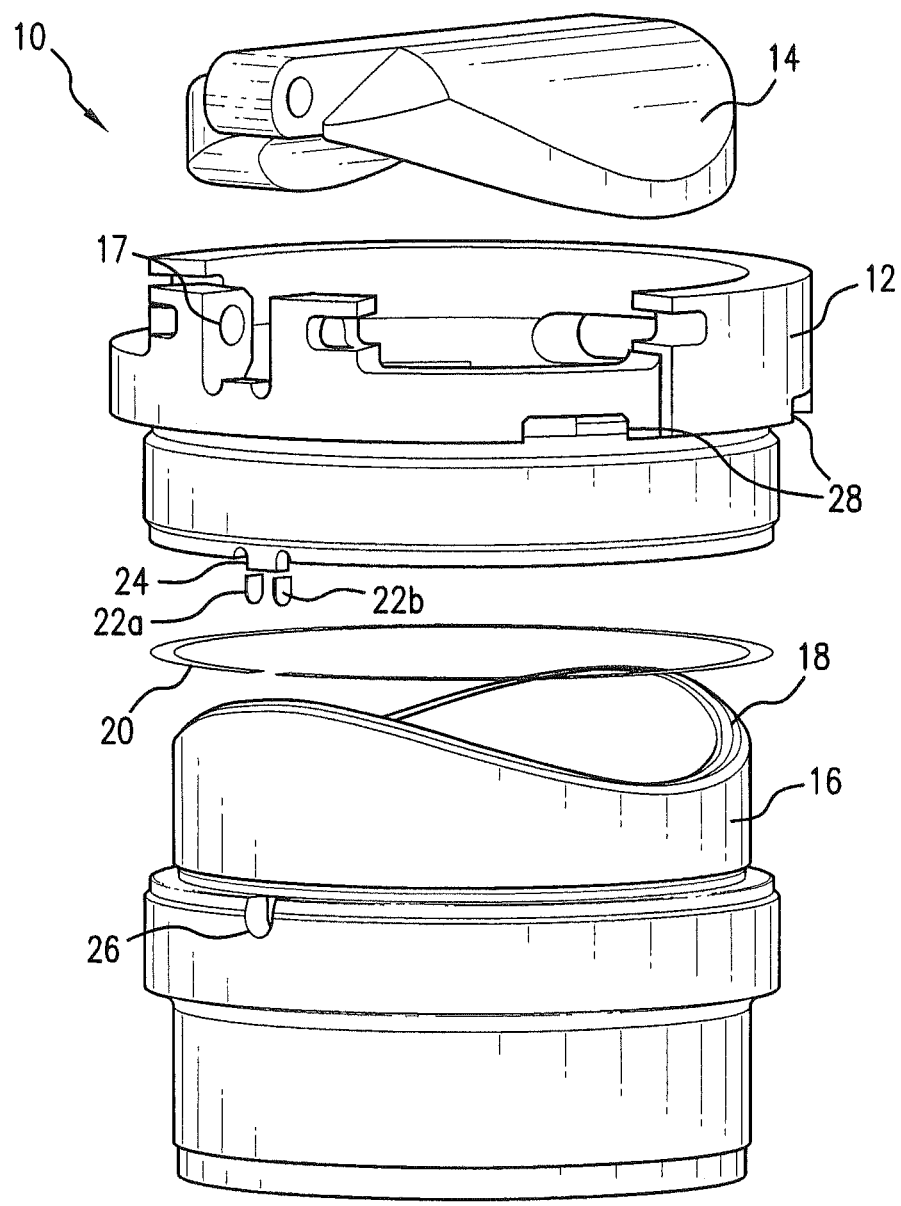
FIG. 1 is an exploded view of a valve assembly having a plurality of alignment shims.
Figure 2:
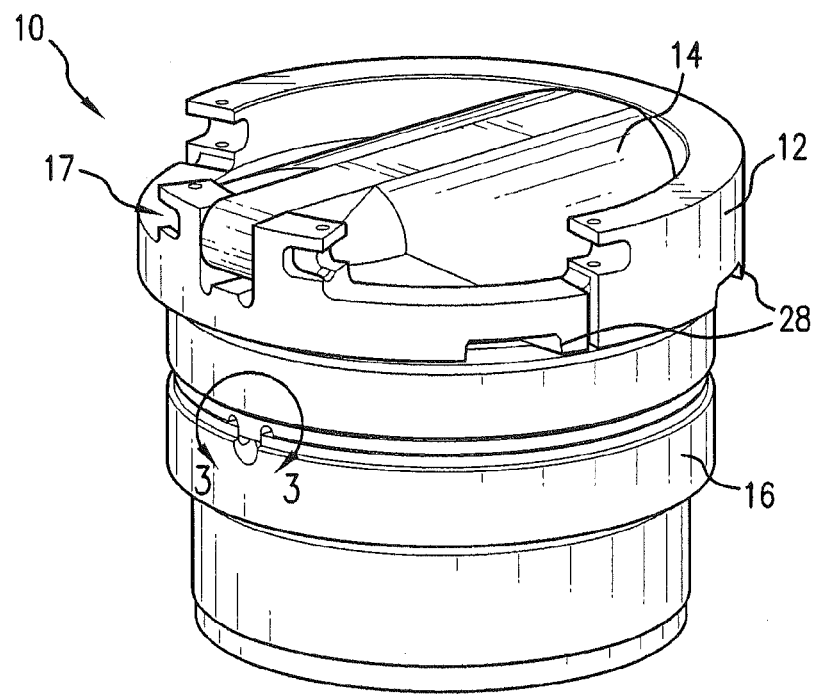
FIG. 2 is a perspective view of the valve assembly of FIG. 1.
Figure 3:
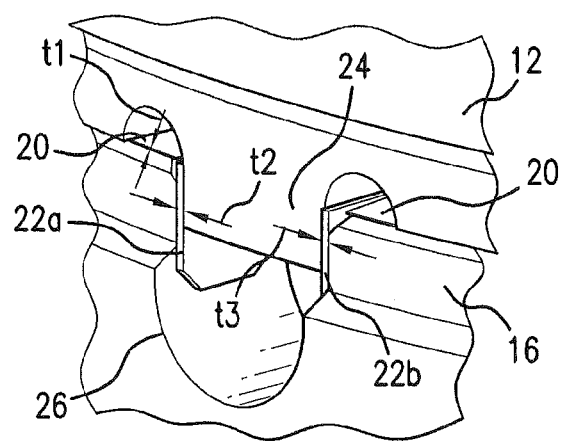
FIG. 3 is an enlarged view of the area 3-3 encircled in FIG. 2.

Referring now to the drawings, a valve assembly 10 is shown in FIGS. 1-3. The valve assembly 10 includes a flapper base 12, a flapper 14, and a seat member 16. It is to be understood that while the current invention is described with respect to "flapper" valves, other valves in which a flapper, lid, etc., engages a seat for selectively preventing fluid flow in at least one direction can be used, e.g., swing check valves, clapper valves, etc. In one embodiment, the valve assembly 10 is part of a subsurface safety valve for a downhole fluid production system. Of course, the valve assembly 10 or other assemblies according to the current invention could be used in systems other than subsurface safety valve, e.g., barrier valves, fluid flow control valves, etc.

The flapper 14 is hingedly or rotatably secured to the base 12, e.g., via a connection 17, e.g., including a pin, pivot, hinge, etc. In this way, the flapper 14 is rotatable in order to selectively engage against the seat member 16 at an interface 18. The interface 18 is formed by a surface or surfaces, e.g., a contoured surface as illustrated, of the seat member 16 that creates a seal when engaged by the flapper 14. When the flapper 14 and the seat member 16 are properly aligned and engaged at the interface 18, i.e., the valve 10 is in a closed configuration, the flow of fluid through the valve assembly 10 is prevented. It is noted that the flapper 14 and the seat member 16 are complementarily formed such that the interface 18 is undulating or curved, e.g., sinusoidally, although other styles of valves are similarly benefited by the current invention, e.g., flat interfaces as discussed below with respect to FIGS. 4-6.

Advantageously, in order to accommodate for, counteract, and/or remedy any misalignment between the components of the valve assembly 10, namely between the flapper 14 and the seat member 16, one or more shims are included. Specifically, the valve assembly 10 includes a longitudinal or axial alignment shim 20 (the "longitudinal shim 20") and a pair of rotational alignment shims 22a and 22b (the "rotational shims 22a and 22b" or collectively the "rotational shims 22"). For example, in the illustrated embodiment, the position of the flapper 14 with respect to the seat member 16, and therefore the accuracy of alignment between the flapper 14 and the seat member 16 at the interface 18 is influenced by the tolerances used in manufacturing the base 12, the flapper 14, the seat member 16, the connection 17, etc. Accordingly, if the flapper 14 and the seat member 16 are not accurately aligned or matched at the interface 18, then the shims 20, 22 can be utilized as needed for setting the position of the flapper 14 relative to the seat member 16. Since the flapper 14 is connected to the base 12, the shims 20, 22 in the illustrated embodiment are located between the base 12 and the seat member 16 (e.g., for convenience in manufacturing and/or assembly), although it is to be appreciated that any other location that alters the position of the flapper 14 relative to the seat member 16 could alternatively be utilized in other embodiments. The shim 20 substantially resembles a C-shaped ring, while the shims 22 resemble relatively thin, polygonal plates.

As shown in more detail in FIG. 3, the longitudinal shim 20 has a thickness t1 in the longitudinal or axial direction. When disposed between the base 12 and the seat member 16, as shown, the longitudinal shim 20 shifts the base 12, and therefore the flapper 14, away from the seat member 16 by a distance equal to the thickness t1. In order to ensure that misalignment does not occur in the opposite direction, i.e., the flapper 14 needing to be moved closer to the seat member 16 (which problem would only be exacerbated by adding more shims), the dimensions and tolerances of the components of the assembly 10 can be set such that even if all tolerances are at their extremes, the flapper 14 and the seat member 16 are either sufficiently aligned or at least one shim is required to enable alignment. In other words, the base 12 and the seat member 16 can be purposely constructed to be too close together when assembled, thereby requiring at least one shim therebetween. In one embodiment, e.g., if the shims 20 are pre-made components, a plurality of the shims 20 could be stacked atop one another for shifting the flapper even further away from the seat member 16. In other embodiments, the shim 20 could be custom-made according to a particular valve geometry.

The rotational shims 22a and 22b respectively have thicknesses t2 and t3, as shown in FIG. 3 and generally take the form of plates. Similar to the longitudinal shim 20, the rotational shims 22 are located between the base 12 and the seat member 16. Specifically, the base 12 includes a locating tab 24 that fits in a notch 26 of the seat member 16 (of course, the base 12 could be arranged with the notch 26 and the seat member 16 with the locating tab 24). The locating tab 24 and the notch 26 act to roughly or coarsely align the flapper 14 with respect to the seat member 16, i.e., so that the undulations at the interface 18 are generally aligned. The notch 26 is provided so that it is circumferentially wider than the tab 24, thereby resulting in gaps on either side of the tab 24 and some rotational "play" between the base 12 and the seat member 16. The rotational shims 22 are provided to remove the "play" between the base 12 and the seat member 16 as well as to set the rotational alignment between the flapper 14 and the seat member 16. For example, if the alignment at the interface 18 is suitably achieved when the tab 24 is centered in the notch 26, the thickness t2 and t3 of the shims 22a and 22b can be set to be equal to each other. However, if the tab 24 must be shifted toward one side or the other of the notch 26 in order to align the flapper 14 and the seat member 16 at the interface 18, then the thicknesses t2 and t3 can be set to different values. In some embodiments, it is possible that only one relatively wide rotational shim (or a combination of multiple stacked shims on only one side of the tab 24) is utilized to hold the tab 24 against a wall of the notch 26.

In order to assist in the manufacture of the valve assembly 10, a window 28, or a plurality thereof, are provided in the base 12 for enabling visual inspection of the interface 18 once the valve assembly 10 has been assembled. By providing the windows 28 at intervals circumferentially about the base 12, as shown, significant portions of the interface 18 can be inspected. In one embodiment, visual inspection is assisted by positioning a light source within the valve assembly 10 and observing or measuring the amount of light that shines through the interface 18 and is visible at the windows 28 when the flapper 14 and the seat member 16 are engaged in a low pressure situation, e.g., held closed only by gravity.

Figure 4:
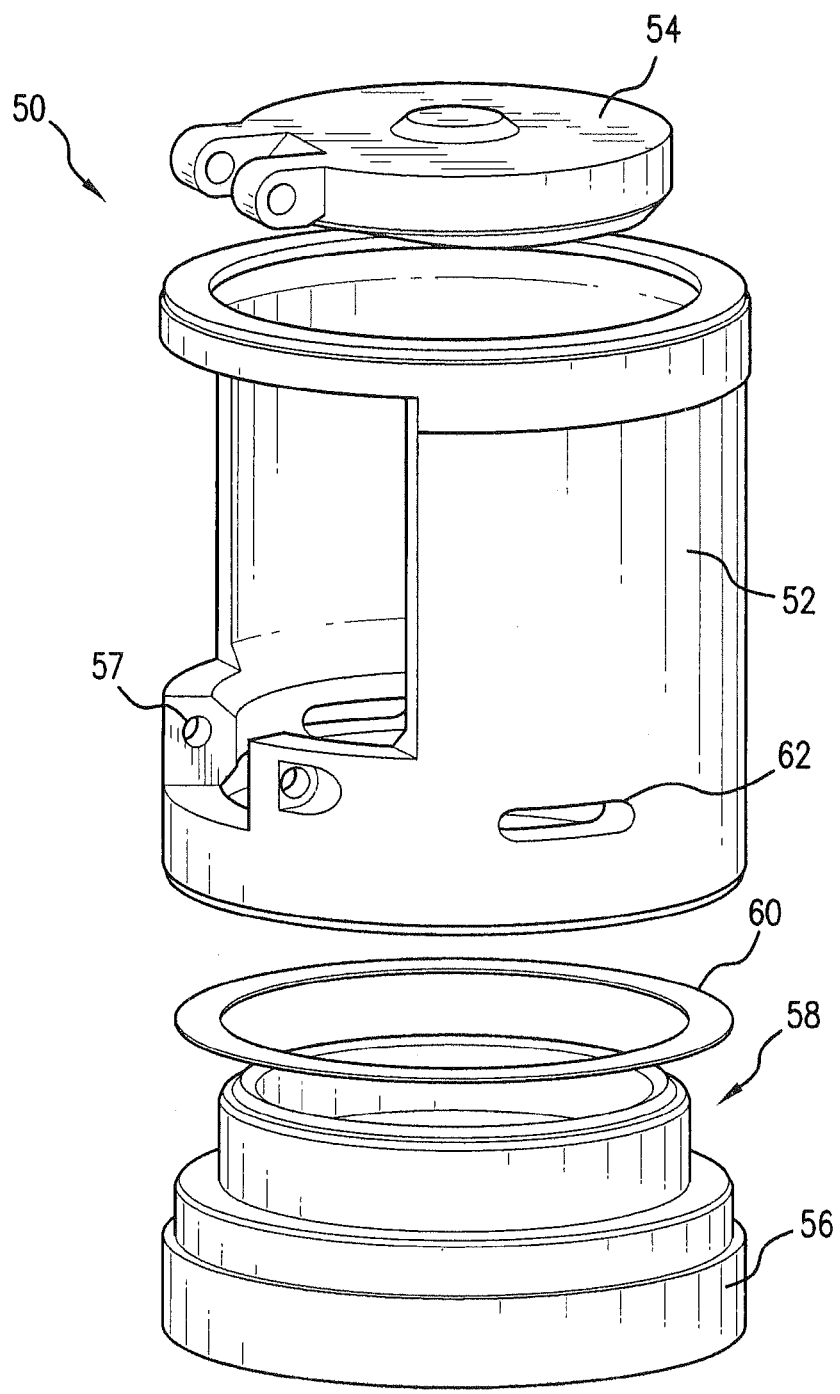
FIG. 4 is an exploded view of a valve assembly according to another embodiment herein.
Figure 5:
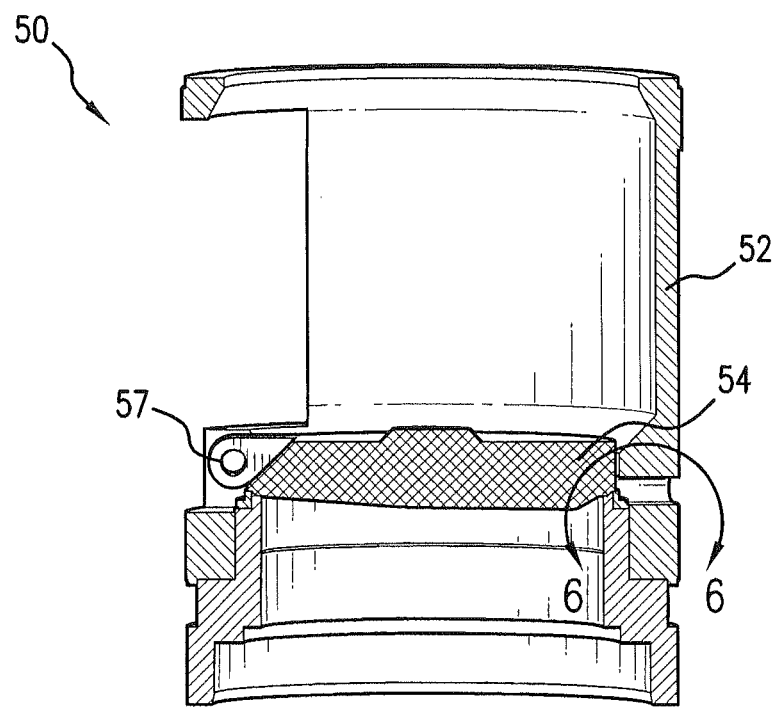
FIG. 5 is a cross-sectional view of the valve assembly of FIG. 4.
Figure 6:
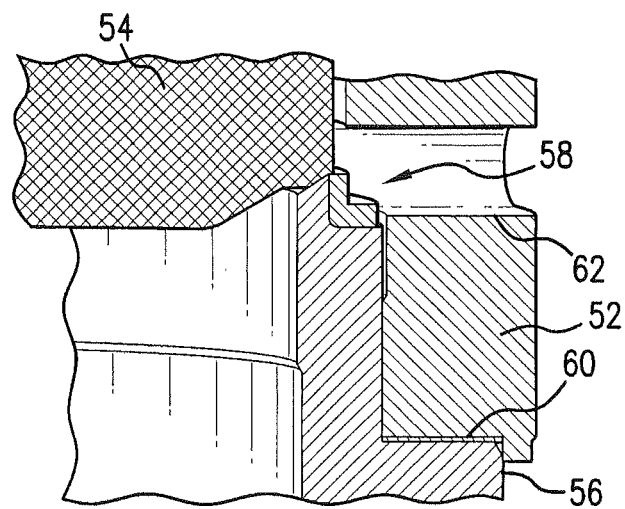
FIG. 6 is an enlarged view of the area 6-6 encircled in FIG. 5.

A valve assembly 50 according to another embodiment herein is illustrated in FIGS. 4-6. The valve assembly 50 generally resembles the assembly 10, e.g., having a flapper base 52, a flapper 54, and a seat member 56, with the flapper 54 rotatably secured to the base 52 at a connection 57, e.g., including a pin, hinge, pivot, etc. However, unlike the valve assembly 10, an interface 58 formed between the flapper 54 and the seat 56 is substantially flat, not undulating or curved. Since there are no undulations, rotational alignment for the assembly 50 is not as important as for the assembly 10, and no locating tabs, notches, or rotational shims are included in the assembly 50. The assembly 50 does however include a longitudinal alignment shim 60, similar to the shim 20, for setting the position the flapper 54 longitudinally with respect to the seat 56. For example, if the flapper 54 is too close to the seat 56, leakage may occur through the interface 58 near the "toe" of the flapper 54. The shim 60 resembles the shim 20 and disclosure relating to the shim 20 is generally applicable to the shim 60 and the assembly 50. For example, similar to the assembly 10, the tolerances and dimensions of the components of the assembly 50 can be set such that even if all of the tolerances are at their extremes, the flapper 54 and the seat 56 are either suitably aligned or at least one shim is required for alignment, multiple ones of the shim 60 could be stacked, e.g., if the shims 60 are pre-made components, the shim 60 could be set with a custom-made thickness for a particular valve geometry, etc. Additionally, the base 52 can include one or more windows 62 circumferentially disposed thereabout for enabling inspection of the interface 58 when the flapper 54 and the seat 56 are engaged, as described above.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A valve assembly, comprising:
   a seat;
   a flapper complementarily formed with respect to the seat for creating a seal at an interface therebetween; and
   one or more shims operatively disposed in the valve assembly for altering a position of the flapper relative to the seat in at least one direction for aligning the flapper and the seat at the interface; at least one of the one or more shims altering the position of the flapper relative to the seat in a rotational direction,
   at least one of the one or more shims altering the position of the flapper relative to the seat in a rotational direction.

2. The valve assembly of claim 1, at least one of the one or more shims altering the position of the flapper relative to the seat in a longitudinal direction.

3. The valve assembly of claim 1, further comprising a locating tab and a notch operatively arranged for coarsely aligning the flapper and the seat rotationally.

4. The valve assembly of claim 3, wherein at least one of the at least one shim is disposed with the locating tab and the notch.

5. The valve assembly of claim 4, wherein the at least one shim comprises a pair of rotational alignment shims disposed on opposite sides of the locating tab in the notch.

6. The valve assembly of claim 5, wherein each shim of the pair of rotational alignment shims has a same thickness.

7. The valve assembly of claim 5, wherein each shim of the pair of rotational alignment shims has a different thickness.

8. The valve assembly of claim 1, wherein the one or more shims comprises a plurality of shims and the at least one direction includes both rotational and longitudinal directions.

9. The valve assembly of claim 1, wherein the one or more shims comprises a plurality of shims.

10. The valve assembly of claim 1, wherein the valve assembly is utilized in a subsurface safety valve system.

11. The valve assembly of claim 1, wherein the flapper, the seat, and the interface therebetween are undulating or curved.

12. The valve assembly of claim 1, wherein the flapper, the seat, and the interface therebetween are substantially flat.

13. The valve assembly of claim 1, wherein the flapper is hingedly secured to a flapper base and the one or more shims is disposed between the base and the seat.

14. A method of aligning a flapper and a seat of a valve assembly, comprising:
   positioning at least one shim in the valve assembly for altering a position of the flapper relative to the seat in at least one direction; wherein the at least one direction is rotational, longitudinal, or a combination including at least one of the foregoing.

15. The method of claim 14, further comprising observing an interface formed between the flapper and the seat through at least one window in the valve assembly.

16. The method of claim 15, wherein observing the interface involves observing light leakage through the interface.

17. The method of claim 15, wherein observing the interface and positioning the at least one shim occur in any order relative to each other and are repeated as desired for aligning the flapper with the seat at the interface.

18. A valve assembly, comprising:
   a seat;
   a flapper complementarily formed with respect to the seat for creating a seal at an interface therebetween;
   one or more shims operatively disposed in the valve assembly for altering a position of the flapper relative to the seat in at least one direction for aligning the flapper and the seat at the interface; and
   at least one window operatively arranged for enabling visual inspection of the interface between the flapper and the seat.

* * * * *